US012636838B2

(12) United States Patent
Anahid et al.

(10) Patent No.: US 12,636,838 B2
(45) Date of Patent: May 26, 2026

(54) QUALITY METRIC FOR PREDICTIVE DEFECT MODEL FOR MULTI-LASER POWDER BED FUSION ADDITIVE MANUFACTURING

(71) Applicant: Raytheon Technologies Corporation, Farmington, CT (US)

(72) Inventors: Masoud Anahid, Galena, OH (US); Matthew E. Lynch, Canton, CT (US); Abdelilah Sakti, East Granby, CT (US)

(73) Assignee: RTX Corporation, Farmington, CT (US)

( * ) Notice: Subject to any disclaimer, the term of this patent is extended or adjusted under 35 U.S.C. 154(b) by 412 days.

(21) Appl. No.: 18/201,792

(22) Filed: May 25, 2023

(65) Prior Publication Data

US 2024/0391174 A1 Nov. 28, 2024

(51) Int. Cl.
*B29C 64/393* (2017.01)
*B33Y 50/02* (2015.01)

(52) U.S. Cl.
CPC ............ *B29C 64/393* (2017.08); *B33Y 50/02* (2014.12)

(58) Field of Classification Search
CPC .................................................. B29C 64/393
See application file for complete search history.

(56) References Cited

U.S. PATENT DOCUMENTS

| 10,888,924 B2 | 1/2021 | Burlatsky et al. |
| 11,203,160 B2 | 12/2021 | Vora et al. |
| 11,531,920 B2 | 12/2022 | Anahid et al. |
| 11,534,961 B2 | 12/2022 | Gold |
| 11,571,747 B2 | 2/2023 | Nassar et al. |
| 2020/0089826 A1* | 3/2020 | Liu ......................... G06T 17/20 |
| 2020/0189193 A1* | 6/2020 | Ostroverkhov ....... B29C 64/393 |
| 2021/0334685 A1* | 10/2021 | Anahid ................... B22F 10/80 |
| 2023/0260103 A1* | 8/2023 | Jahangir ................. B22F 12/90 |
| | | 382/152 |

FOREIGN PATENT DOCUMENTS

| CN | 111761819 A | * | 10/2020 | ............ B33Y 50/00 |
| CN | 113084193 | | 7/2021 | |
| JP | 2023535930 A | * | 8/2023 | ............ B33Y 50/00 |
| KR | 20250009643 A | * | 1/2025 | ............ B33Y 40/00 |

OTHER PUBLICATIONS

Extended European Search Report for counterpart EP Application No. 24163911.1 dated Aug. 2, 2024.

(Continued)

*Primary Examiner* — Suresh Suryawanshi
(74) *Attorney, Agent, or Firm* — Bachman & LaPointe, P.C.

(57) ABSTRACT

A process for an external optimization framework utilizing a defect model for multi-laser additive manufacturing of a part including determining a scalar metric for the part; employing the scalar metric in the defect model; providing at least one output from the defect model to the external optimization framework; and optimizing the powder bed fusion additive manufacturing process for the part with the external optimization framework.

18 Claims, 3 Drawing Sheets

(56) References Cited

OTHER PUBLICATIONS

Xunfei Zhou et al., "Accelerating extrusion-based additive manufacturing optimization processes with surrogate-based multi-fidelity models.", The International Journal of Advanced Manufacturing Technology, Springer, London, vol. 103, No. 9, pp. 4071-4083, May 17, 2019.

Brock Partee et al., "Selective Laser Sintering Process Optimization for Layered Manufacturing of CAPA 6501 Polycaprolactone Bone Tissue Engineering Scaffolds", Journal of Manufacturing Science and Engineering, vol. 128, No. 2, pp. 531-540, May 1, 2006.

T.P. Moran et al., "Scan-by-scan part scale thermal modelling for defect prediction in metal additive manufacturing", Additive Manufacturing, vol. 37, Oct. 23, 2020.

Rui Liu et al., "A Physics-Informed Machine Learning Model for Porosity Analysis in Laser Powder Bed Fusion Additive Manufacturing", Arxiv.Org, Cornell University Library, 201 Olin Library, Cornell University, Ithaca, NY 14853, Jan. 13, 2021.

Extended European Search Report for counterpart EP Application No. 24166059.6 mailed Sep. 25, 2024.

Mohamad Bayat et al., "A review of multi-scale and multi-physics simulations of metal additive manufacturing processes with focus on modeling strategies", Additive Manufacturing, Elsevier, Netherlands, vol. 47, Sep. 2, 2021.

* cited by examiner

QUALITY METRIC FOR PREDICTIVE DEFECT MODEL FOR MULTI-LASER POWDER BED FUSION ADDITIVE MANUFACTURING

U.S. GOVERNMENT RIGHTS

This invention was made with Government support under contract number W911NF-19-9-0001 awarded by the United States Army. The government has certain rights in this invention.

BACKGROUND

The present disclosure relates generally to additive manufacturing, and more specifically to a process for determining a scalar metric that describes the overall quality of a part fabricated by additive manufacturing operations.

Additive manufacturing is a process that is utilized to create components by applying sequential material layers, with each layer being applied to the previous material layer. As a result of the iterative, trial and error, construction process, multiple different parameters affect whether an end product created using the additive manufacturing process includes flaws or is within acceptable tolerances of a given part. Typically, components created using an additive manufacturing process are designed iteratively, by adjusting one or more parameters each iteration and examining the results to determine if the results have the required quality.

Multi-laser additive manufacturing (AM) technology is a promising process to increase allowable part size and rate of production. However, multiple lasers in additive systems could add further complications and challenges to material quality. There is no known tool to predict defect formation and dependency to process parameters for multi-laser applications. It is known how to predict defect type, density and location at the part level under a single laser operation. An example can be the teaching in U.S. Pat. No. 10,252,512 which is incorporated by reference herein.

What is not well known is the determination of a quality metric associated with predicted defects in parts. Multi-laser additive manufacturing, owing to multiple lasers is capable of producing different types of defects such as lack of fusion and keyhole porosity. As the number of lasers acting simultaneously increases, the likelihood of multi-laser interaction goes up.

What is needed is a process for determining a quality metric associated with types of defects in components produced by multi-laser powder bed fusion additive manufacturing (PBFAM).

SUMMARY

In accordance with the present disclosure, there is provided a system comprising a computer readable storage device readable by the system, tangibly embodying a program having a set of instructions executable by the system to perform the following steps for predicting defects in powder bed fusion additive manufacturing process for a part, the set of instructions comprising an instruction to determine a scalar metric for the part; an instruction to employ the scalar metric in a defect model; an instruction to provide at least one output from the defect model to an external optimization framework; and an instruction to optimize the powder bed fusion additive manufacturing process for the part with the external optimization framework.

A further embodiment of any of the foregoing embodiments may additionally and/or alternatively include the scalar metric describes the overall quality of the part fabricated by powder bed fusion additive manufacturing with respect to predicted defects.

A further embodiment of any of the foregoing embodiments may additionally and/or alternatively include the scalar metric is configured as a single number employed as an objective or as a constraint in the optimization of the powder bed fusion additive manufacturing process for the part.

A further embodiment of any of the foregoing embodiments may additionally and/or alternatively include the system for additive manufacturing further comprising an instruction to discretize the part in space in preparation for determining the scalar metric.

A further embodiment of any of the foregoing embodiments may additionally and/or alternatively include the system for additive manufacturing further comprising an instruction to discretize the part by a set of nodes used for a finite difference computation.

A further embodiment of any of the foregoing embodiments may additionally and/or alternatively include the system for additive manufacturing further comprising an instruction to compute the scalar metric from discretizations, such as finite volume or finite element.

A further embodiment of any of the foregoing embodiments may additionally and/or alternatively include the system for additive manufacturing further comprising an instruction to compute the scalar metric as a sum of a total number of nodes predicted to contain defects divided by a total number of nodes in the part.

A further embodiment of any of the foregoing embodiments may additionally and/or alternatively include the system for additive manufacturing further comprising an instruction to determine the scalar metric used to interface with the external optimization framework, wherein the scalar metric comprises the ratio of a number of defected nodes to total nodes used in the defect model.

A further embodiment of any of the foregoing embodiments may additionally and/or alternatively include the system for additive manufacturing further comprising an instruction to determine the defect quality metric as a ratio of a sum of fractional defect density at each defected node to total nodes used in the defect model.

A further embodiment of any of the foregoing embodiments may additionally and/or alternatively include the system for additive manufacturing further comprising an instruction to introduce a location criticality weighting coefficient configured to discourage defects in critical regions of a part.

A further embodiment of any of the foregoing embodiments may additionally and/or alternatively include the location criticality weighting coefficient is proportional to stress.

In accordance with the present disclosure, there is provided a process for an external optimization framework utilizing a defect model for multi-laser additive manufacturing of a part comprising determining a scalar metric for the part; employing the scalar metric in the defect model; providing at least one output from the defect model to the external optimization framework; and optimizing the powder bed fusion additive manufacturing process for the part with the external optimization framework.

A further embodiment of any of the foregoing embodiments may additionally and/or alternatively include the scalar metric describes the overall quality of the part fabricated by powder bed fusion additive manufacturing with respect to predicted defects.

A further embodiment of any of the foregoing embodiments may additionally and/or alternatively include the process further comprising configuring the scalar metric as a single number employed as an objective or as a constraint in the optimization of the powder bed fusion additive manufacturing process for the part.

A further embodiment of any of the foregoing embodiments may additionally and/or alternatively include the process further comprising discretizing the part in space in preparation for determining the scalar metric.

A further embodiment of any of the foregoing embodiments may additionally and/or alternatively include the process further comprising discretizing the part by a set of nodes used for a finite difference computation.

A further embodiment of any of the foregoing embodiments may additionally and/or alternatively include the process further comprising computing the scalar metric as a sum of a total number of nodes predicted to contain defects divided by a total number of nodes in the part.

A further embodiment of any of the foregoing embodiments may additionally and/or alternatively include the process further comprising determining the scalar metric used to interface with the external optimization framework, wherein the scalar metric comprises the ratio of a number of defected nodes to total nodes used in the defect model.

A further embodiment of any of the foregoing embodiments may additionally and/or alternatively include the process further comprising determining the defect quality metric as a ratio of a sum of fractional defect density at each defected node to total nodes used in the defect model.

A further embodiment of any of the foregoing embodiments may additionally and/or alternatively include the process further comprising introducing a location criticality weighting coefficient configured to discourage defects in critical regions of a part, wherein the location criticality weighting coefficient is proportional to stress.

Other details of the process are set forth in the following detailed description and the accompanying drawings wherein like reference numerals depict like elements.

DETAILED DESCRIPTION

Figure 1:
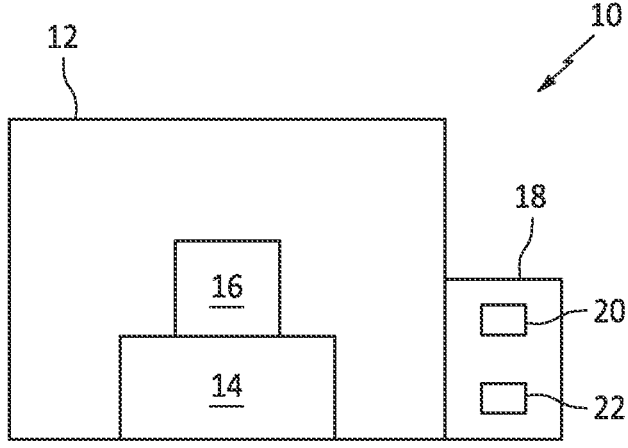
FIG. 1 is a schematic representation of an exemplary additive manufacturing machine.

Referring now to FIG. 1, schematically illustrates an additive manufacturing machine 10, such as a laser powder bed fusion additive manufacturing (PBFAM) machine. In alternate examples, the powder bed fusion machine can be an electron beam powder bed fusion machine. The exemplary additive manufacturing machine 10 includes a manufacturing chamber 12 with a platform 14 upon which a part 16 (alternatively referred to as a work piece) is additively manufactured. A controller 18 is connected to the chamber 12 and controls the additive manufacturing process according to any known additive manufacturing control system.

Included within the controller 18 is a processor 20 that receives and interprets input operations to define a sequence of the additive manufacturing. As utilized herein "operations" refers to instructions specifying operational conditions for one or more step in an additive manufacturing process. The controller 18 can, in some examples, include user interface devices such as a keyboard and view screen. In alternative examples, the controller 18 can include a wireless or wired communication apparatus for communicating with a remote user input device such as a PC.

Also included in the controller 18 is a memory 22. In some examples, the controller 18 receives a desired additive manufacturing operation, or sequence of operations, and evaluates the entered operation(s) to determine if the resultant part 16 will be free of flaws. For the purposes of the instant disclosure, free of flaws, or flaw free, refers to a part 16 or workpiece with no flaws causing the part or workpiece to fall outside of predefined flaw tolerance. By way of example, the predefined tolerances can include an amount of unmelt, a surface roughness, or any other measurable property of the part 16. By way of example, factors impacting the output parameters can include material properties, environmental conditions, laser power, laser speed, or any other factors. While described and illustrated herein as a component of a laser powder bed fusion additive manufacturing machine, the software configuration and operations can, in some examples, be embodied as a distinct software program independent of the additive manufacturing machine or included within any other type of additive manufacturing machine.

A build strategy is parsed and/or specifically prescribed scan vectors are used to create stripe and hatch definitions in each layer of the build. The additive build is simulated layer-by-layer. The output is a map in build parameter space (e.g. laser power, laser speed, layer thickness, etc.). The map is partitioned into different regions reflecting whether flaws are present: lack of fusion, keyholing, the flaw-free "good" zone, etc. A process map is optionally location-specific and dependent upon geometry. If the entirety of a part is in the "good" zone of the process map, it is predicted to be flaw-free.

By using the defined process map, a technician can generate a part 16, or design a sequence of operations to generate a part 16, without requiring substantial empirical prototyping to be performed. This, in turn, allows the part to be designed faster, and with less expense, due to the substantially reduced number of physical iterations performed.

Figure 2:
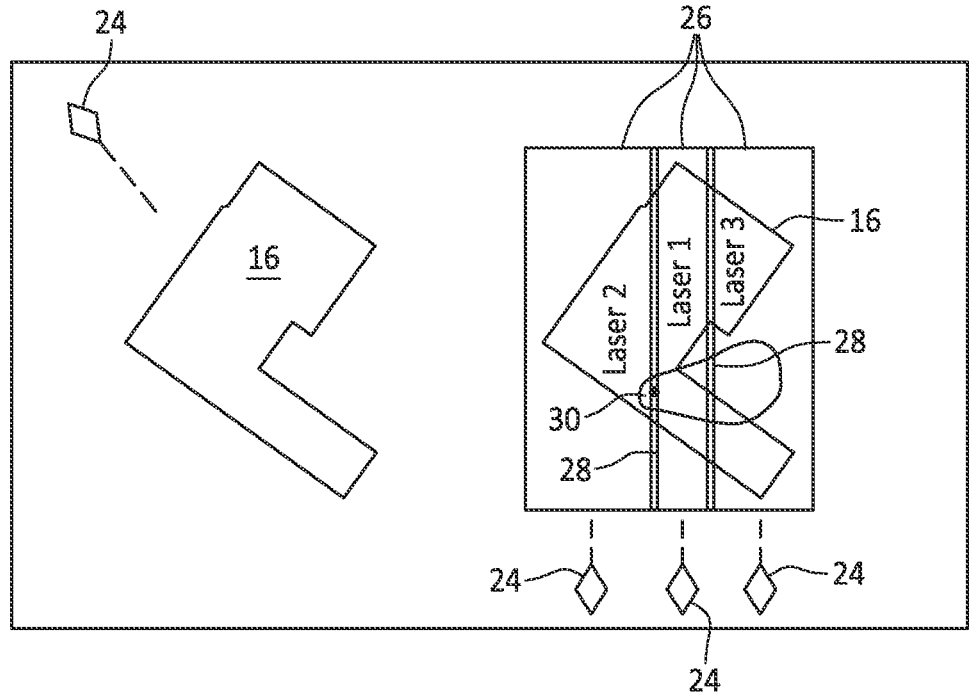
FIG. 2 is a schematic representation of a part created by a single laser along side the part created by multiple lasers.

Referring also to FIG. 2, the part 16 is shown as being created by a single laser and multiple lasers. The part 16 shown on the left side of FIG. 2 is laid down by use of a single laser 24. The whole part 16 is assigned to the single laser 24. The part 16 shown to the right side of FIG. 2 is assigned to multiple lasers 24. The multi-laser fusion is configured to increase the rate at which the part 16 can be built. The single laser fusion can have a different set of heat flux, interlayer dwell time, underlying temperature than the multi-laser fusion configuration.

With multi-laser fusion processes, the part 16 can be divided into multiple regions 26, such as laser 1 region, laser 2 region and laser 3 region, as shown. Each region 26 can be processed by the different lasers 24. So, each region may have a different set of heat flux, interlayer dwell time, underlying temperature, and the like.

In FIG. 2, the multi-laser arrangement can include laser interface 28 along the common boundaries of the regions 26. It is possible to create a laser interaction zone 30 near these interfaces 28. The lasers 24 can create conditions that cause interaction between the adjoining lasers 24.

Figure 3:
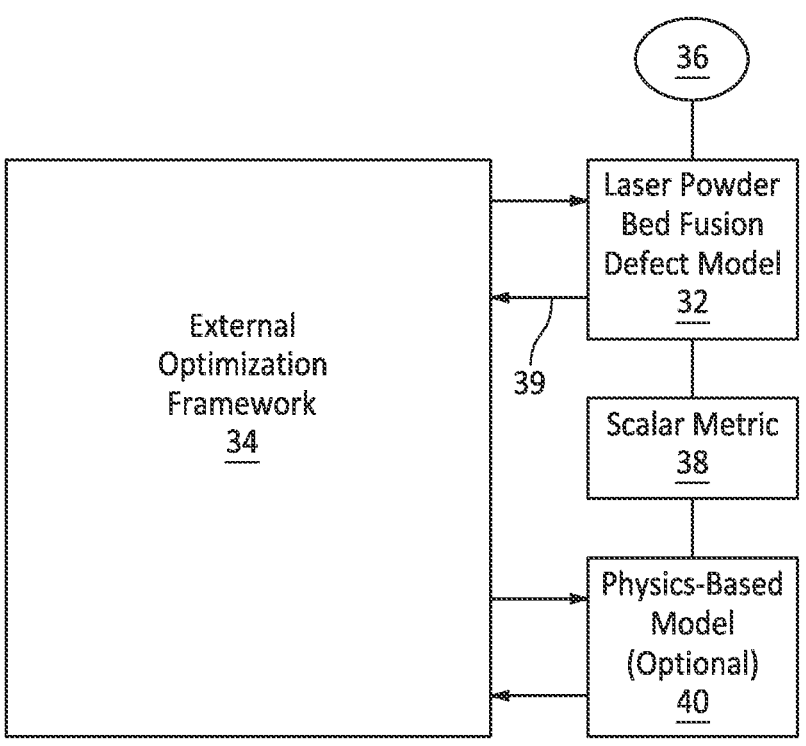
FIG. 3 is a schematic representation of interaction between a laser powder bed fusion defect model with external optimization framework.

Referring also to FIG. 3 a diagram of a laser powder bed fusion defect model 32 with external optimization framework 34 is shown. In an exemplary embodiment, the defect model 32 can generate a time-location map for lasers 24 using the inputs provided by the user including scan speed, hatch distance and stripe angle. The user can also provide delay time for the lasers 24 if there is a lag between the lasers 24 to start a layer. The defect model 32 can employ a multi-laser code which uses a global simulation domain rather than a local simulation domain used by an alternative defect code. An analysis tool 36 operates the defect model 32 to produce the necessary outputs utilized by the additive manufacturing machine 10. A scalar metric 38 can be employed as an objective or constraint in a process for the defect model 32 of the analysis tool 36. The scalar metric 38 can be employed to determine optimal additive manufacturing build parameters or to determine optimal geometry for the part 16. The defect model 32 can utilize the scalar metric 38 and produce an output 39 to the external optimization framework 34. The external optimization framework 34 can optimize the powder bed fusion additive manufacturing process.

In an exemplary embodiment, the external optimization framework can employ additional physics-based model(s) 40 as an additional avenue to optimize the powder bed fusion additive manufacturing process.

Figure 4:
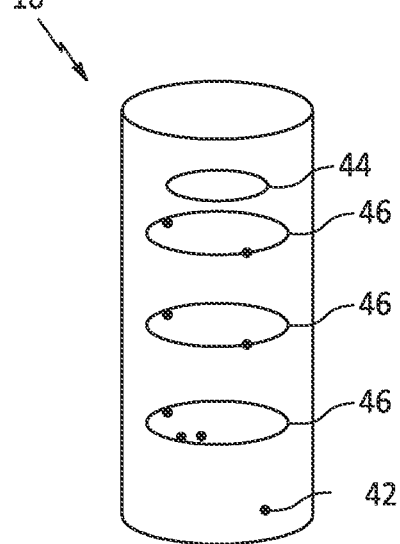
FIG. 4 is a schematic representation of an exemplary part with defects.

Referring also to FIG. 4, an exemplary part 16 is shown having defects 42. The part 16 can be any part such that can be manufactured by laser powder bed fusion additive manufacturing. The part 16 is shown as a 3D structure having random defects 42. The defects 42 can be a lack of fusion of the powder bed material by the laser, keyholes, voids, porosity, layer discontinuities, and/or other imperfections associated with powder bed fusion additive manufacturing.

Optimizing additive manufacturing build parameters in parts 16 with complex geometries can be challenging. Overall optimization of a part 16 may seek to minimize the number or amount of porosity/defects 42 and/or drive them to regions of the part 16 with low criticality. The scalar metric 38 describes the overall quality of a part 16 fabricated by powder bed fusion additive manufacturing with respect to predicted defects 42, such as porosity. The scalar metric 38 is a single number which allows the metric to be used as an objective or as a constraint.

In order to compute the metric 38, the part 16 must be discretized in space (i.e., divided into smaller volumes). One embodiment can include the part 16 being discretized by a set of nodes 44 used for finite difference computation. The use of the metric can be utilized by the defect model 32. The metric 38 can be computed from other discretizations, such as finite volume or finite element. In that case, the language may be adapted to that discretization, i.e.; referring to volume or elements rather than nodes 44.

In an exemplary embodiment, the most straightforward way to compute the quality metric 38 is to sum the total number of nodes 46 predicted to contain defects 42 and divide by the total number of nodes 44 in the part 16. In an exemplary embodiment, the metric 38 can be extended to sum defect density predicted at defected nodes 46. In an exemplary embodiment, the metric 38 may be extended to factor in location criticality through the use of a weighting factor. Locations may be weighted based on stress or other phenomenon that influences part life or performance.

The defect quality metric 38 can be used to interface with the external optimization framework 34 and can be the ratio of the number of defected (finite difference) nodes 46 to total nodes 44 used in the defect model 32.

The quality metric $q_g$ 38 can be expressed as:

$$q_g = \frac{\sum_{g=1}^{N_g} p_g}{N_g}$$

where $p_g$: defect at grid point g used in the defect model (binary value); and $N_g$: number of grid points.

In an exemplary embodiment, the defect quality metric 38 can be a ratio of the sum of fractional defect 42 density at each defected (finite difference) nodes 46 to total nodes 44 used in the defect model 32.

The quality metric $q_g$ 38 can be expressed as:

$$q_g = \frac{\sum_{g=1}^{N_g} d_g}{N_g}$$

where $d_g$: fractional defect density predicted by defect model; and $N_g$: number of grid points.

Figure 5:
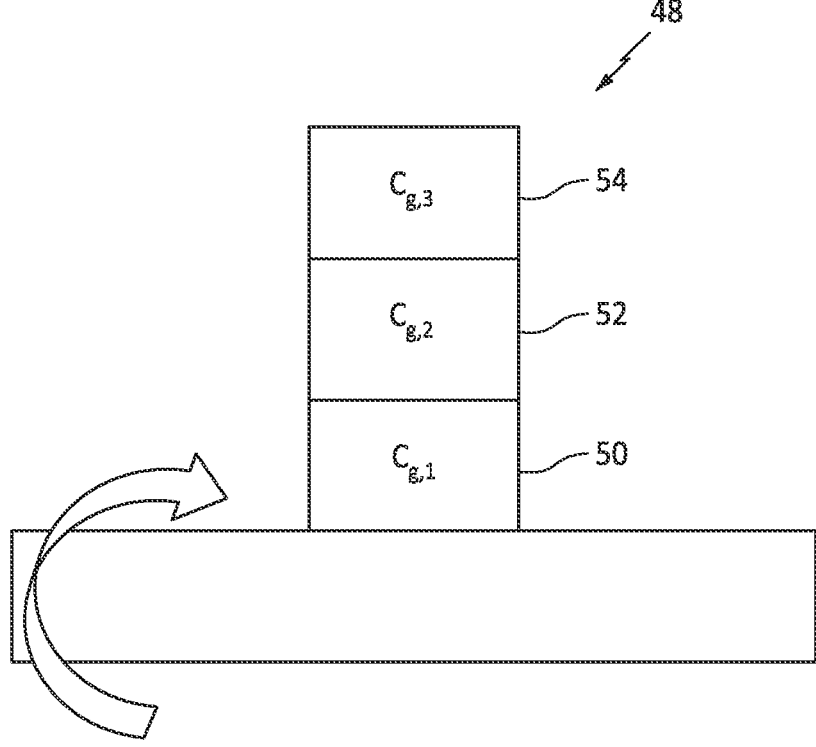
FIG. 5 is a schematic representation of an exemplary blade.

In an exemplary embodiment, the defect quality metric 38 can introduce a location criticality weighting coefficient $c_g$ to discourage defects 42 in more critical regions of a part 16. Referring also to FIG. 5, an exemplary part such as an additively manufactured blade/vane 48 is shown. The blade or vane 48 can include a root portion 50, an airfoil portion 52 and a tip portion 54.

In a first version with a location criticality weighting coefficient $c_g$, the quality metric $q_g$ 38 can be expressed as:

$$q_g = \frac{\sum_{g=1}^{N_g} c_g p_g}{N_g}$$

where $p_g$: defect at grid point g used in the defect model (binary value); $c_g$: part location criticality weighting coefficient; and $N_g$: number of grid points.

In a second version with a location criticality weighting coefficient $c_g$, the quality metric $q_g$ 38 can be expressed as:

$$q_g = \frac{\sum_{g=1}^{N_g} c_g d_g}{N_g}$$

where $d_g$: fractional defect density predicted by defect model; CA: part location criticality weighting coefficient; and $N_g$: number of grid points.

The stress in the blade/vane 48 is considered higher proximate the root portion 50 than at the tip portion 54 for a normal operating condition. The part criticality weighting factor is larger at the root of the blade where stress is highest.

$$c_{g,1} > c_{g,2} > c_{g,3} \geq 1$$

The part criticality weighting factor $c_g$ may be proportional to stress.

$$c_g \propto \sigma$$

A technical advantage of the disclosed process can include the ability to use a scalar metric to optimize additive manufacturing parameters and part geometries.

Another technical advantage of the process can include application to multi-laser powder bed fusion additive manufacturing.

Another technical advantage of the process can include providing a higher quality multi-laser powder bed fusion additive manufacturing.

Another technical advantage of the process can include faster multi-laser powder bed fusion additive manufacturing processing.

Another technical advantage of the process can include optimized laser path planning to maximize laser on-time while minimizing laser interaction and therefore defect production.

Another technical advantage of the process can include helping engineers and designers understand and develop multi-laser powder bed fusion additive manufacturing processes to increase rate of production and build large size parts.

Another technical advantage of the process can include minimizing the costly and time-consuming trial and error practices which are currently used for qualifying additive manufacturing parts.

Another technical advantage of the process can include information obtained from this predictive model can be utilized to additively manufacture high quality parts which in turn minimizes post-build operations in the production process chain.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system comprising a computer readable storage device readable by the system, tangibly embodying a program having a set of instructions executable by the system to perform the following steps for predicting defects in powder bed fusion additive manufacturing process for a part, the set of instructions comprising:
    an instruction to determine a scalar metric for the part;
    an instruction to employ the scalar metric in a defect model;
    an instruction to provide at least one output from the defect model to an external optimization framework; and
    an instruction to optimize the powder bed fusion additive manufacturing process for the part with the external optimization framework; and
    an instruction to determine the scalar metric used to interface with the external optimization framework, wherein the scalar metric comprises the ratio of a number of defected nodes to total nodes used in the defect model.

2. The system for additive manufacturing according to claim 1, wherein the scalar metric describes the overall quality of the part fabricated by powder bed fusion additive manufacturing with respect to predicted defects.

3. The system for additive manufacturing according to claim 1, wherein the scalar metric is configured as a single number employed as an objective or as a constraint in the optimization of the powder bed fusion additive manufacturing process for the part.

4. The system for additive manufacturing according to claim 1, further comprising:
    an instruction to discretize the part in space in preparation for determining the scalar metric.

5. The system for additive manufacturing according to claim 1, further comprising:
    an instruction to discretize the part by a set of nodes used for a finite difference computation.

6. The system for additive manufacturing according to claim 1, further comprising:
    an instruction to compute the scalar metric from discretizations, such as finite volume or finite element.

7. The system for additive manufacturing according to claim 1, further comprising:
    an instruction to compute the scalar metric as a sum of a total number of nodes predicted to contain defects divided by a total number of nodes in the part.

8. The system for additive manufacturing according to claim 1, further comprising:
    an instruction to introduce a location criticality weighting coefficient configured to discourage defects in critical regions of a part.

9. The system for additive manufacturing according to claim 8, wherein the location criticality weighting coefficient is proportional to stress.

10. A process for an external optimization framework utilizing a defect model for multi-laser additive manufacturing of a part comprising:
    determining a scalar metric for the part;
    employing the scalar metric in the defect model;
    providing at least one output from the defect model to the external optimization framework;
    optimizing a powder bed fusion additive manufacturing process for the part with the external optimization framework; and
    determining the scalar metric used to interface with the external optimization framework, wherein the scalar metric comprises the ratio of a number of defected nodes to total nodes used in the defect model.

11. The process of claim 10, wherein the scalar metric describes the overall quality of the part fabricated by the powder bed fusion additive manufacturing process for the part with the external optimization framework with respect to predicted defects.

12. The process of claim 10, further comprising:
    configuring the scalar metric as a single number employed as an objective or as a constraint in the optimization of the powder bed fusion additive manufacturing process for the part with the external optimization framework.

13. The process of claim 10, further comprising:
    discretizing the part in space in preparation for determining the scalar metric.

14. The process of claim 10, further comprising:
    discretizing the part by a set of nodes used for a finite difference computation.

15. The process of claim 10, further comprising:
    computing the scalar metric as a sum of a total number of nodes predicted to contain defects divided by a total number of nodes in the part.

16. The process of claim 10, further comprising:
    introducing a location criticality weighting coefficient configured to discourage defects in critical regions of a part, wherein the location criticality weighting coefficient is proportional to stress.

17. A system comprising a computer readable storage device readable by the system, tangibly embodying a program having a set of instructions executable by the system to perform the following steps for predicting defects in powder bed fusion additive manufacturing process for a part, the set of instructions comprising:

an instruction to determine a scalar metric for the part;

an instruction to employ the scalar metric in a defect model;

an instruction to provide at least one output from the defect model to an external optimization framework;

an instruction to optimize the powder bed fusion additive manufacturing process for the part with the external optimization framework; and an instruction to determine the defect quality metric as a ratio of a sum of fractional defect density at each defected node to total nodes used in the defect model.

18. A process for an external optimization framework utilizing a defect model for multi-laser additive manufacturing of a part comprising:

determining a scalar metric for the part;

employing the scalar metric in the defect model;

providing at least one output from the defect model to the external optimization framework;

optimizing a powder bed fusion additive manufacturing process for the part with the external optimization framework; and determining the defect quality metric as a ratio of a sum of fractional defect density at each defected node to total nodes used in the defect model.

\* \* \* \* \*